(12) United States Patent
Nachom (10) Patent No.: US 7,072,856 B1
(45) Date of Patent: Jul. 4, 2006

(54) COMMUNICATION ENHANCEMENT MEANS

(76) Inventor: Al Nachom, 10308 Almyo Ave., #2, Century City, CA (US) 90064

( * ) Notice: Subject to any disclaimer, the term of this patent is extended or adjusted under 35 U.S.C. 154(b) by 254 days.

(21) Appl. No.: 09/487,354

(22) Filed: Jan. 18, 2000

(51) Int. Cl.
*G06F 17/60* (2006.01)

(52) U.S. Cl. .............. 705/26; 705/27; 705/64; 705/67; 705/75; 705/76

(58) Field of Classification Search .......... 705/26, 705/27, 1, 80, 64, 67, 75, 76
See application file for complete search history.

(56) References Cited

U.S. PATENT DOCUMENTS

| | | | | |
|---|---|---|---|---|
| 4,992,940 | A | * | 2/1991 | Dworkin ............... 705/26 |
| 5,572,643 | A | * | 11/1996 | Judson ................. 709/218 |
| 5,899,980 | A | * | 5/1999 | Wilf et al. ............. 705/26 |
| 5,905,736 | A | * | 5/1999 | Ronen et al. .......... 705/26 |
| 5,946,665 | A | | 8/1999 | Suzuki et al. |
| 5,960,411 | A | | 9/1999 | Hartman et al. |
| 5,963,915 | A | | 10/1999 | Kirsch |
| 5,983,199 | A | | 11/1999 | Kaneko |
| 5,991,739 | A | | 11/1999 | Cupps et al. |
| 5,991,740 | A | * | 11/1999 | Messer ................ 705/26 |
| 6,070,149 | A | * | 5/2000 | Tavor et al. .......... 705/26 |
| 6,141,653 | A | * | 10/2000 | Conklin et al. ........ 705/80 |

FOREIGN PATENT DOCUMENTS

JP 404014161 A * 1/1992

OTHER PUBLICATIONS

Internet Web site of LinkShare, 1998-1999.*
IBM Technical Disclosure Bulletin, TDB-ACC-NO: NA83123286, Title: Transaction response message authentication, vol. 26.*

* cited by examiner

*Primary Examiner*—Elisca Pierre Eddy
(74) *Attorney, Agent, or Firm*—Blakely, Sokoloff, Taylor & Zafman, LLP (57) ABSTRACT

A method and system for placing an order for an item via the Internet. The item may be related to the subject matter of a first site being visited by a user or may be related to the subject matter of a purchase transaction conducted by the user on the first site. The first site issues a request to a second site to provide a related item from purchase by the user. The second site provides a display component having actuation unit thereon for the user to assent to or decline the purchase of the related item. If the user declines the item, the display component is removed. If the user assents to the purchase of the item, the second site receives the billing and user information from the first site in a secure fashion, and the item is delivered to the user either by the second site or by outsourcing.

30 Claims, 5 Drawing Sheets

Site A to Site B
Request to open a sub window with a relevant offer

HTTP://www.bsite.com/upsell.asp?vendor=4728348&order=63452&product1=7676564&product2=9983478

Site B to Site A
Request for complete record on a secured connection

HTTPS://www.asite.com/completerecord.asp?order=63452&upsell=774624

54

Site A Response
html page on a secured connection

Order Number = 63452
First Name = John
Last Name = Smith
Address 1 = 123 Sesame St.
Address 2 =
City = Los Angeles
State = CA
Country = United States
Phone = 310-555-5555
Email = jsmith@aol.com
Credit Card = 4444333322221111
Expiration = 1204

56

Site B to site C
Placing Order on secured connection https://sitec.com/order.asp?Reseller="siteB"&OriginalSite="Site A"&OriginalOrder="63452"&FirstName="John"&LastName="Smith"&Address1="123 Sesame St."&Address2=""&City="Los Angeles"&State="CA"&Country="United States"&Phone="310-555-5555"&Email="jsmith@aol.com"&CreditCard="4444333322221111"&Expiration="1204"

COMMUNICATION ENHANCEMENT MEANS

FIELD OF THE INVENTION

The present invention is generally related to systems for performing commercial transactions electronically and, in particular, to a system and method for providing users of a computer network the opportunity to purchase additional products and/or services provided by an alternate source.

BACKGROUND OF THE INVENTION

The acceptance of the Internet as a source of information, products, and services has increased over the last few years. Accordingly, the number of users of the Internet has similarly grown quite rapidly and in turn the number of transactions occurring thereon has augmented. Normally, a client computer requests a specific Web page using a unique Uniform Resource Locator (URL) and the request is forwarded to the Web server that supports that Web page. That Web server then supplies the Web page to the client computer and is displayed thereon by the use of a browser using Hyper-Text Markup Language (HTML). The HTML document that is provided by the Web server contains various tags that control the displaying of text, graphics, controls, and other features. The HTML document may contain URLs of other Web pages available on that server computer system.

Electronic commerce is conducted on a Web page by providing an electronic version of a catalog that lists the items that are available on that Web page. A user may browse through the catalog using a browser and select various items that are to be purchased. In addition, the Web page may have hyperlinks to other Web pages that provide products and/or services. However, the advertising of the hyperlinks or active bit map images is randomly conducted.

If a user decides to purchase a specific product, the server may provide a form for the user to insert the user's name, the user's credit card number or alternate method of payment information, and a shipping address for the order, or the product and/or service may be delivered electronically. Since the information relayed from the user is sensitive and personal, the information may be relayed through a secure connection using various encryption techniques that are known in the art. The server computer system typically confirms the order by sending a confirming Web page to the client computer system and coordinates delivery of the item.

If the user desires to conduct another transaction that is ancillary to the finished transaction, the user will have to conduct a search of the Web and look for the desired product. Once the desired product is found, the user will have to reenter the previously entered personal information. The current system is inefficient because it requires many interactions by the user in order to find an ancillary or related product and to reenter the information again.

U.S. Pat. No. 5,960,411 to Hartman et al. discloses a method and system for single-action ordering of items in a client/server environment. The server system disclosed therein assigns a unique client identifier to each client system. The server system also stores purchaser-specific order information that may have been collected from a previous order placed by the purchaser. The server system then maps each client identifier to a purchaser that may use that client system to place an order on their Web page. When a purchaser places an order, the server system determines whether the client identifier for that client system is mapped to a purchaser. If so mapped, the server system provides a single-action ordering page to the client computer system. When the purchaser performs that single action, the client system notifies the server system, which in turn completes the order by adding the purchaser-specific order information. However, the invention is limited to the specific Web page on that specific server and does not provide an auxiliary product for purchase on an alternate site.

U.S. Pat. No. 5,991,739 to Cupps et al. discloses an online ordering system that allows users to order food and delivery thereof from various participating restaurants. The online ordering system categorizes the location of each participating restaurant by a set of coordinates based on longitude and latitude and each customer's location is similarly categorized. The online ordering then conducts a search for those restaurants that are proximally located to the customer provides the Web pages therefor to the customer for ordering. The order is received from a customer for a particular product and the order is converted into voice instructions which are transmitted to the vendor through a telephone call. Alternatively, the order can be transmitted to the vendor via facsimile transmission and the vendor can then call the customer. The disclosure does not provide for a system that requests a related product and/or service offer post-sale and does not provide for the transmission of user and billing information.

U.S. Pat. No. 5,946,665 to Suzuki et al. discloses an online search tool that allows a customer to input the name of the goods and/or services and the name is then searched and a list of stores and/or malls that provide the goods and/or services is then provided to a customer. In addition, log information is collected on the customer and stored such as the stores which the customer entered and the names of the goods the customer purchased. Based on the customer's previous conduct, the list is structured to provide the customer with stores that he or she previously visited and the goods that they purchased. The disclosure does not provide for a system that requests a related product and/or service offer post-sale and does not provide for the transmission of user and billing information.

U.S. Pat. No. 5,983,199 Kaneko discloses an online shipping system which enables users to shop by clicking on hyperlinks that are posted on the home pages. The invention monitors a Point-to-Point Protocol (PPP) dial-up from a user device through the server and allows the extraction of the user's phone number through the connections. Thus the operator of the web page can make telephone contact with the user who has exhibited interest in the operator's web page. The disclosure does not provide for a system that requests a related product and/or service from an alternate source to be introduced to the user and does not provide for the transmission of user and billing information upon the user's approval.

U.S. Pat. No. 5,963,915 to Kirsch discloses a shopping system over a computer network in a secure fashion. A persistent predetermined coded identifier, such as a cookie, is established on the client browser corresponding to an account record stored by a merchant server which the user has previously visited. If the client conducts another purchase transaction with the merchant, the predetermined coded identifier is received by the merchant server and validated against the server stored account record and the transaction is either confirmed or denied. The disclosure does not provide for a system that requests a related product and/or service from an alternate source to be introduced to the user and does not provide for the transmission of user and billing information upon the user's approval.

The prior art does not address the need for increasing sales of a related product in a convenient and efficient manner which introduction is responsive to the user's conduct and selection. Therefore, there remains a long standing and continuing need for an advance in the art of post-transaction promotions that is simpler in both design and use, and is more economical and convenient to implement and use.

SUMMARY OF THE INVENTION

Accordingly, it is general object of the present invention to overcome the disadvantages of the prior art.

In particular, it is an object of the present invention to provide an invention that can operate with longevity.

It is another object of the present invention to provide an Internet related up-sale system.

It is yet another object of the present invention to provide an Internet related up-sale system that is convenient to use by a client.

It is another object of the present invention to provide an increased sale of a related product from an alternate source.

It is another object of the present invention to provide for the sale of a related product from an alternate source that is related to the original purchase.

It is still another object of the present invention to provide for the sale of a related product from an alternate source the introduction of which is requested by the Web page that is being currently visited.

It is another object of the present invention to provide a convenient means for securely transferring a user's sensitive information from a first source to an alternate source.

It is yet another object of the present invention to provide for the introduction of related products and/or services from an alternate source that does not compete with the products and/or services of the original source.

It is a further object of the present invention to eliminate the need for redundant input to conduct a secure purchase transaction on an alternate Web page In keeping with the principles of the present invention, a unique apparatus and method for increasing post-sale transactions is presented. On the Internet, a client computer uses a browser application to visit Web pages that are stored on servers, with each Web page having a unique and corresponding URL. When a user visits a Web page, for example site A, the user can either browse or make purchases on site A. Depending on the products and/or services that the user shows an interest in, site A can issue a request to site B to provide information relating to the products and/or services in which the user has shown an interest. Accordingly, site B provides information to the user of site A, that may be in the form of a pop-up screen or embedded into the text and graphics of site A itself, and provides the user with the option to view details of the products and/or services, to purchase the products and/or services, or to decline the offer.

If the offer of site B is declined, the information that was provided thereby is withdrawn. If the offer of site B is accepted, then site B requests the transfer of billing and user information from site A so that the redundant entry of personal information is not repeated. If site A does not have the proper information regarding the user, site B may alternatively present the user with a form requesting the necessary information to complete the transaction. Alternatively, if the user requests further information regarding the products and/or services of site B, then the user may either be transferred to the site B home page or information may be transferred to the pop-up window.

After a transaction is completed between site B and the user, site B records the information and if the products and/or services are directly provided by site B, then the requested products and/or services are delivered to the user. Alternatively, if site B does not directly provide the products and/or services, site B may pass the order and the delivery information to an automated order processing system on site C for conventional order fulfillment.

Such stated objects and advantages of the invention are only examples and should not be construed as limiting this invention. These and other objects, features, aspects, and advantages of the invention herein will become more apparent from the following detailed description of the embodiments of the invention when taken in conjunction with the accompanying drawings and the claims that follow.

BRIEF DESCRIPTION OF THE DRAWINGS

It is to be understood that the drawings are to be used for the purposes of illustration only and not as a definition of the limits of the invention. In the drawings, wherein similar reference characters denote similar elements throughout the several views.

DETAILED DESCRIPTION OF THE INVENTION

Figure 1:
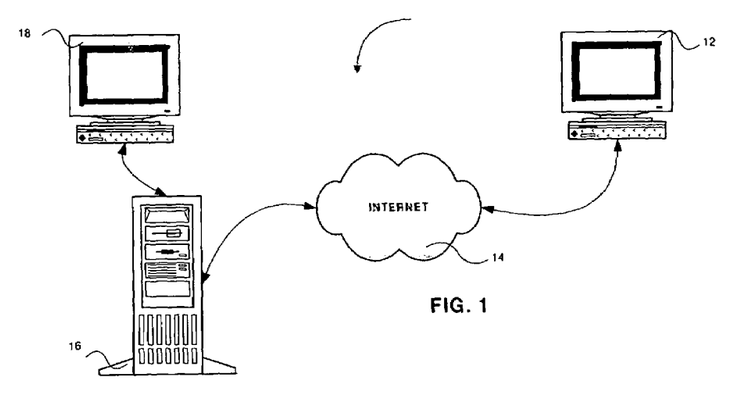
FIG. 1 is an illustration of a client/server system architecture providing for a hyper-text transfer protocol connection between client and server computer systems.

Referring now to FIG. 1, therein is illustrated an Internet computer system 10. A conventional client computer 12, executing a client browser application that supports a generally accepted protocol such as, but not limited to, the HTTP protocol is connected typically through an Internet Service Provider (ISP) to an internet 14. A first server 16 is coupled to the Internet 14 and is controlled by a local console 18 that executes a web server application conventionally known as a HTTP server. In addition, first server 16 preferably provides storage for at least one, though typically many Web pages.

The client computer 12 requests a Web page by issuing a URL request through Internet 14 to first server 16. A URL request for a secure Internet transaction may also be requested and typically utilizes the secure protocol identifier "https," wherein the client browser and Web server support and implement the secure sockets layer. In response to the received URL, server 16 returns the requested Web page to client computer 12. The URL issued from client computer 12 may also be of a complex form that identifies a common gateway interface (CGI) program on server 16. The CGI program may be a logon form supported by a logon CGI program to obtain a client user's login name and password to initiate an authenticated session between the client browser and Web server for purposes of supporting, for example, but not limited to, a purchase transaction.

Figure 2:
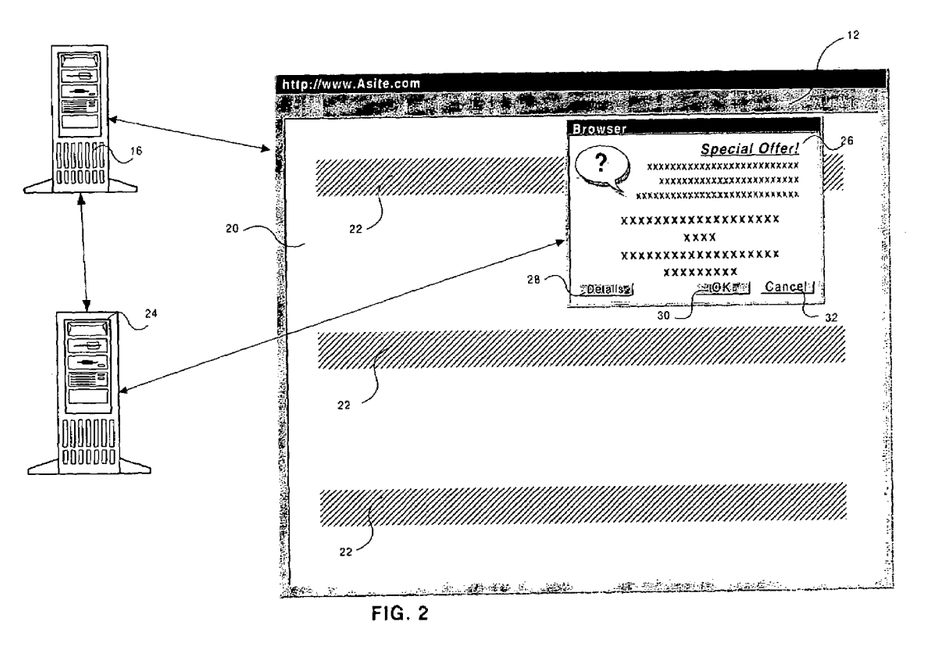
FIG. 2 illustrates a communication between a first server and a second server to provide information from the second server to a Web site on the first server.

Now also referring to FIG. 2, an exemplary Web page 20 having a URL of http://www.asite.com as provided by first server 16 is illustrated. Web page 20 may have a plurality of indicia 22 thereon, wherein indicia 22 may be either text or graphics. In addition, indicia 22 may also be hyperlinks that represent a direct reference to an embedded URL or an active image map which, when selected, will provide an alternate Web page corresponding to the selected hyperlink.

In a preferred embodiment, when a specific URL is requested, such as http://www.asite.com, first server 16 will send a request to second server 24 to provide information 26 that may be related to the subject matter on site A. Information 26 may be an offer for the sale of a related products and/or services that are provided by site B. Accordingly, an exemplary GET request may be:

http://www.bsite.com/upsell.asp?vendor=63452&product 1=7676564&product2=9983478

Upon receipt of the GET request, second server 24 may search a stored database and provide an offer that may be related to the subject matter of site A and in the general interest of the client user. Information 26 may be presented in the form of a pop-up screen or an embedded hyperlink URL in web page 20 that provides for the sale of a product and/or service from site B. Information 26 may have a first actuation means 28, a second actuation means 30, and a third actuation means 32. First actuation means 28 may be a details icon that provides a hyper link URL that transfers the user to site B in order to obtain more information regarding the offer. Second actuation means 30 may be an OK icon that allows the user to accept the offer (described in detail below). Third actuation means 32 may be a cancel icon that allows the user to decline the offer.

Figure 3:
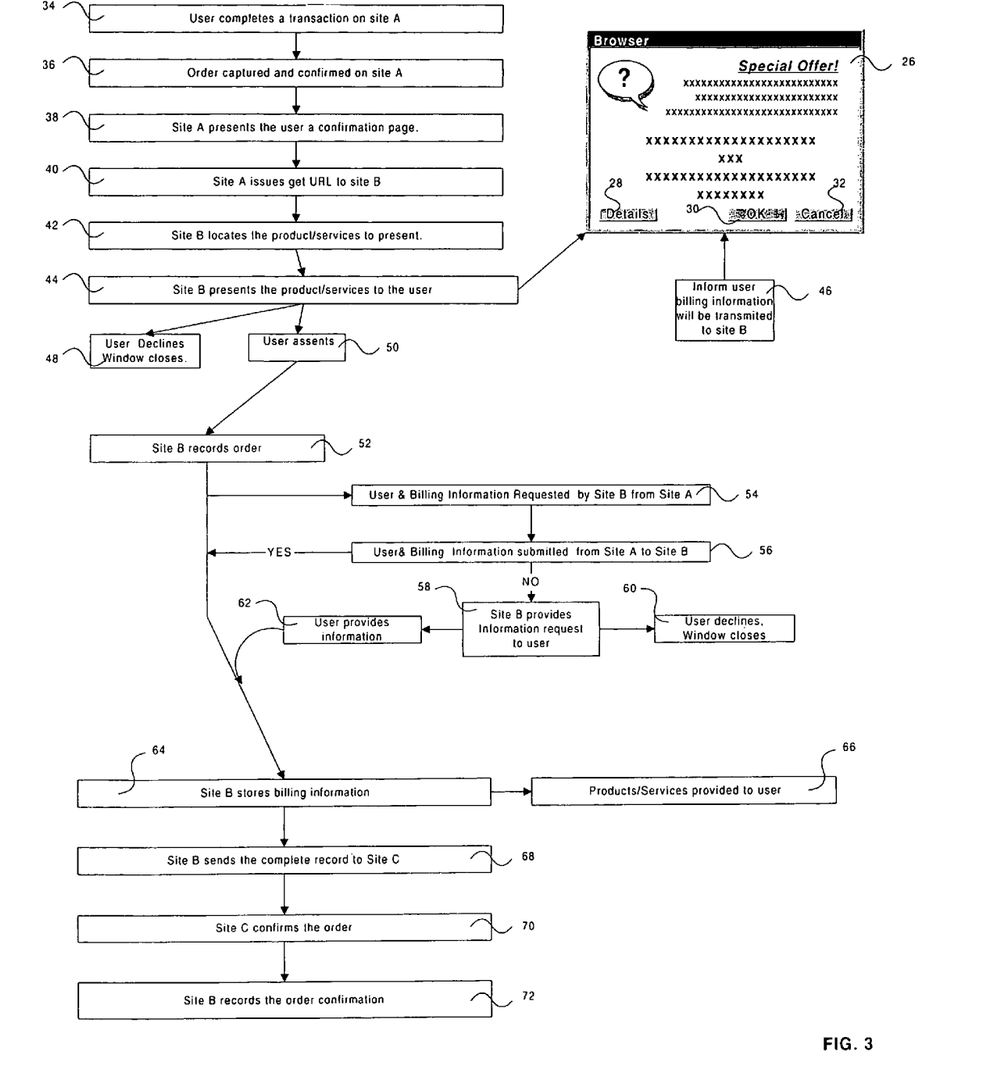
FIG. 3 is a flow diagram of the process of providing a client with information from a second server and allowing the transfer of information from a first server to a second server upon assent of a client user.
Figure 4:
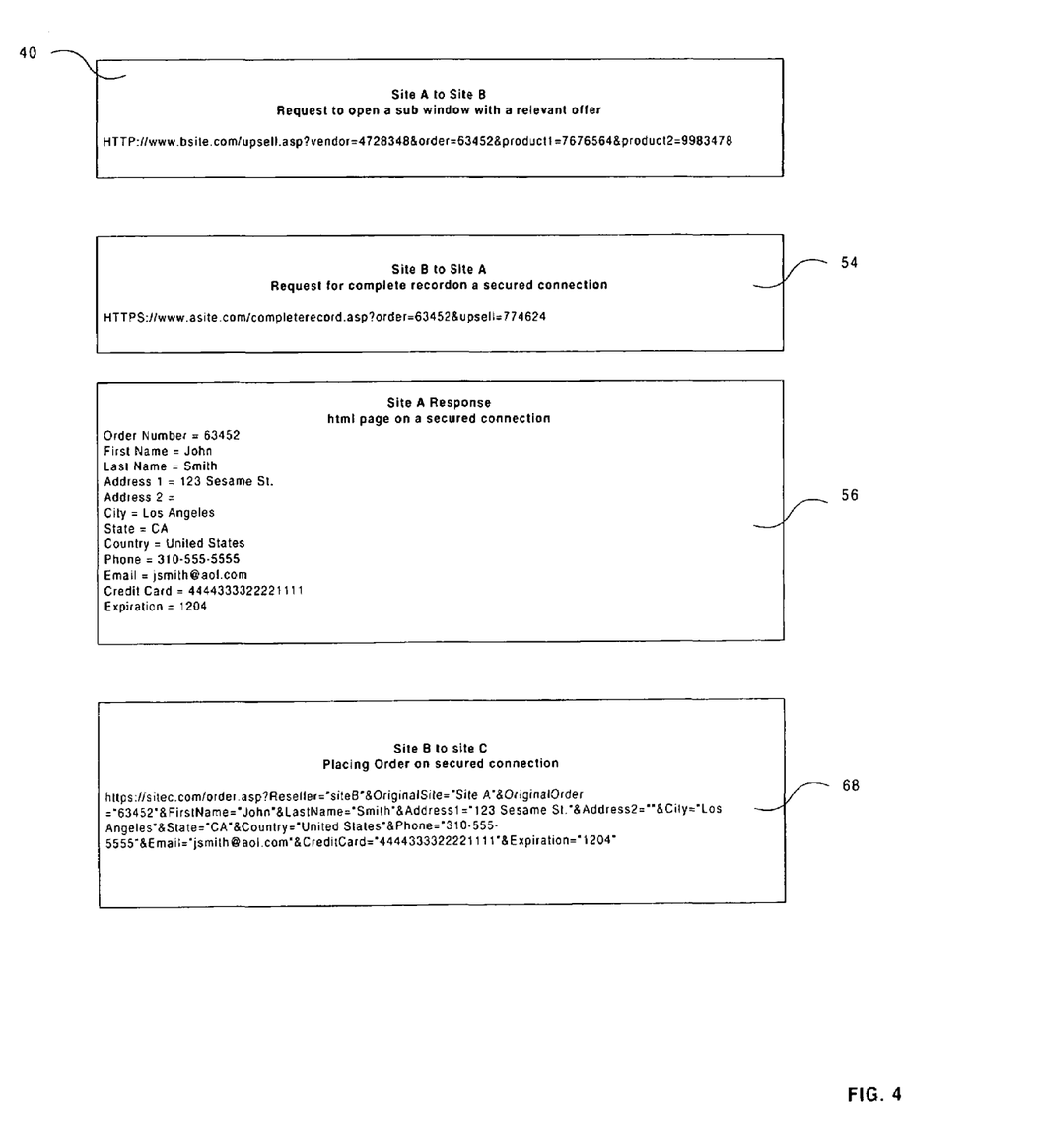
FIG. 4 is an exemplar of a protocol that may be used to accommodate the communication between servers.

Now also referring to FIGS. 3, and 4, flow diagrams are provided to illustrate an alternate preferred embodiment of the present invention. User completes a transaction on site A 34 and the order is captured on site A 36 and a confirmation page is provided to the user 38. Site A issues a get URL to site B 40 that may be in the exemplary form of:

http://www.bsite.com/upsell.asp?vendor=63452&product 1=7676564&product2=9983478

Site B determines which product and/or service to present to the user 42 and provides the user with the product 44 in the form of information 26. Information 26 also informs the user that if accepted, Site A will share user billing information with Site B 46. If third actuation means 32 is selected, the information 26 will be withdrawn 48. If second actuation means 30 is selected, the user assents to information 50 and site B records the transaction. Site B issues a request to Site A for billing & user information 54 that may be expressed in an exemplary fashion as:

https://www.asite.com/ completerecord.asp?order=63452&upsell=774624

In response to the request from site B, site A provides complete billing and user information to site A 56 over a preferably secure connection. If site A does not have complete billing and user information, site B provides an information request form directly to the user 58. The information request may request whatever information is deemed appropriate by site B in order to establish a purchase transaction with the user. If the user declines to provide the information 60, the window closes and the offer is withdrawn. If the user provides the information 62, the transaction is then recorded 64.

After the user approves the purchase of the product and/or service, second server 24 may process the order and the product and/or service is directly provided to the user 66. Alternatively, site B may pass the order to an automated order processing system on site C 68 for order fulfillment consistent with conventional order processing practices to provide for the delivery of the product and/or service purchased to the user. Site C then confirms the order 70, and sends a confirmation to site B where it is recorded 72.

Figure 5:
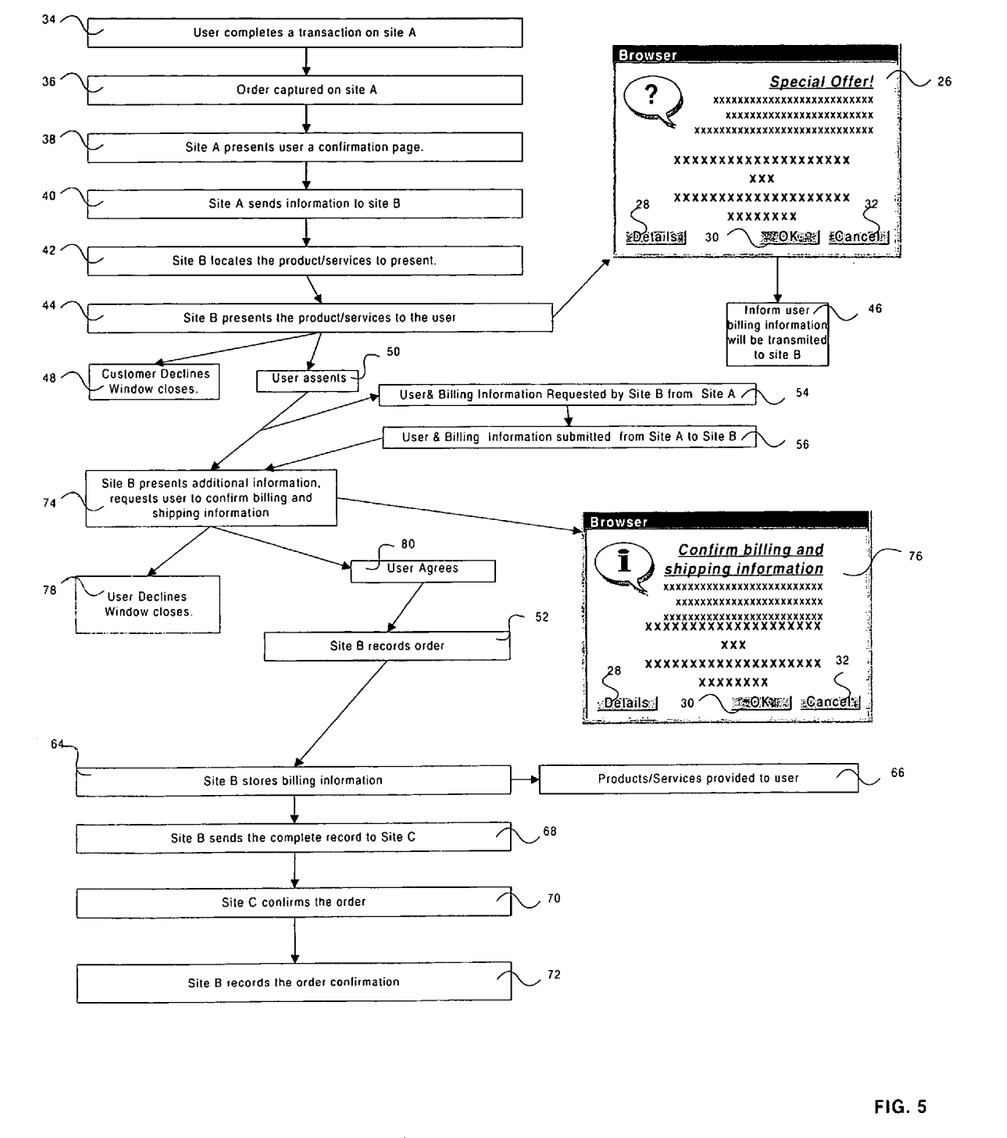
FIG. 5 is a flow diagram of another preferred embodiment of the process of providing a user with information from a second server and allowing the transfer of information from a first server to a second server upon assent of a client user.

Now referring to FIG. 5, an alternate preferred embodiment is illustrated in a flow diagram. The steps are similar to FIG. 4 until the user assents to the special offer 50. Site B then issues a request for billing and user information from site A 54. Site A submits billing and user information to site B 56. If the information provided is sufficient, then site B may record the order 64 as previously explained supra. Alternatively, if insufficient information is provided by site A, site B may request additional information 74 from the user by providing a form 76 therefor to the user. In addition, site B may request the user to confirm the order 74 in form 76. If the order is not confirmed 78 then the form 76 and the window closes. If the order is assented to 80, then site B records the order 52 and the product and/or service is provided to the user as described supra.

Figure 6:
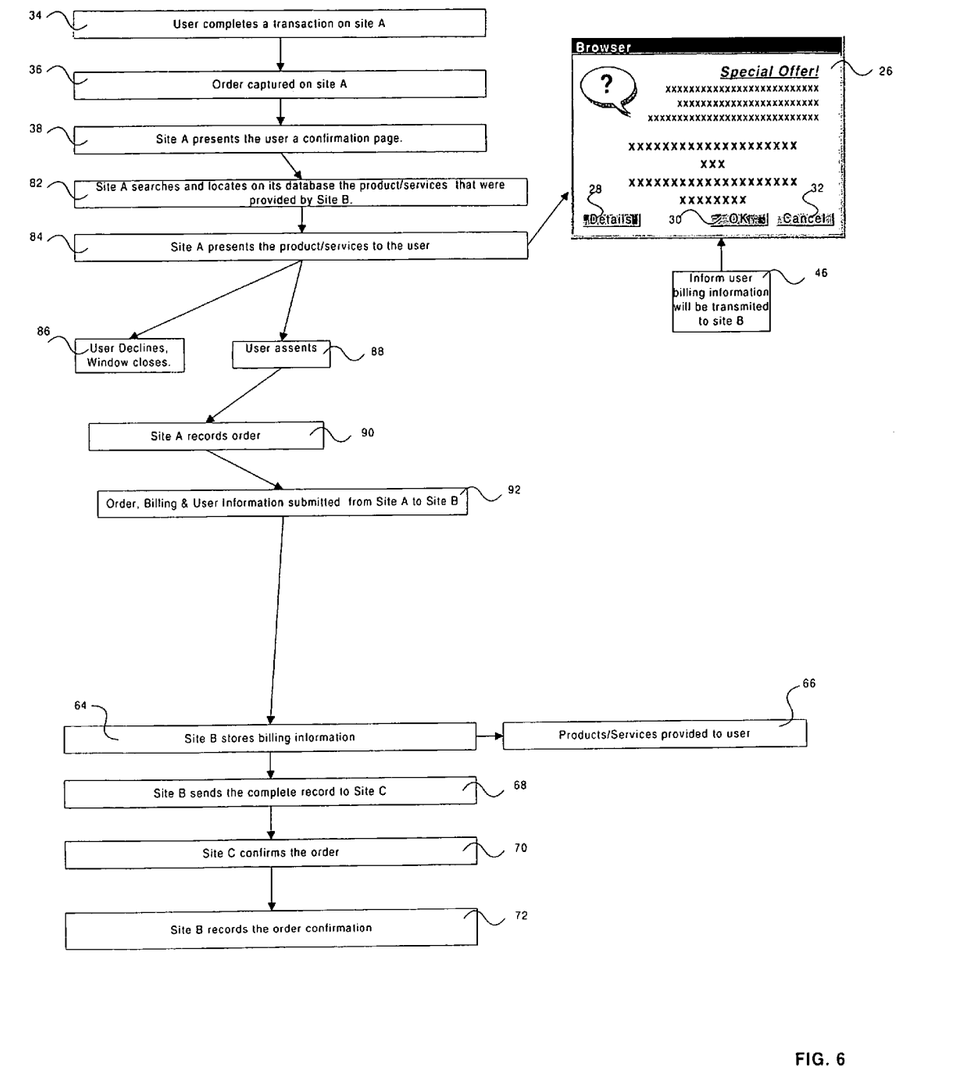
FIG. 6 is a flow diagram of another preferred embodiment of the process of providing information from a first server to the client user wherein the information is previously supplied from a second server and is stored on a data base communicating with the first server, and allowing the transfer of information from the first server to the second server upon assent of the user.

Now referring to FIG. 6, an alternate preferred embodiment is illustrated in a flow diagram. The steps are similar to FIG. 4 until site A sends the user a confirmation page 38. Site A then searches and locates on its database the products and/or services that have been previously provided by Site B 82. Site A then presents the product and/or services to the user 84 with notice that billing information will be transferred to site B 46. If user declines the offer, the information window 26 will close 86. If the user assents to the offer 88, site A then records the order 90. Order, billing, and user information is then submitted from Site A to Site B 92. Site B then records the information 64, and the product and/or services are then provided to the user as described supra.

While the above description contains many specificities, these should not be construed as limitations on the scope of the invention, but rather as an exemplification of preferred embodiments thereof. Many other variations are possible without departing from the essential spirit of this invention. Accordingly, the scope of the invention should be determined not by the embodiment illustrated, but by the appended claims and their legal equivalents.

What is claimed is:

1. A method comprising:
    obtaining a first set of electronic information to be displayed to a user from a first source on a network, wherein the first set of electronic information comprises information identifying a first transaction to be made;
    accepting transaction data to effect the first transaction;
    routing the transaction data to a second source;
    requesting a second set of electronic information to be displayed to the user from the second source on the network, wherein the second set of electronic information comprises information identifying a second transaction to be made;

providing data to display to the user a visual representation of the second set of electronic information as though originating from the first source; and accepting a transaction authorization directed to the first source for the second transaction.

2. The method of claim 1, wherein the transaction authorization comprises a user authorization to share the transaction data with the second source.

3. The method of claim 1, wherein routing the transaction data comprises autonomously communicating with the second source without the user's knowledge.

4. The method of claim 1, wherein the transaction authorization comprises a request to the user for additional transaction data to effect a sale of a second product or service.

5. The method of claim 1, further comprising obtaining a third set of electronic information to be displayed to the user from the second source as though originating from the first source, wherein the third set of electronic information comprises billing and shipping information to be confirmed by the user.

6. The method of claim 1, wherein the transaction data includes information identifying at least one of a first product or service to be purchased, a method of payments, and billing information.

7. The method of claim 6, wherein the billing information comprises at least one of a billing address, a user's name, an email address, a method of payment, and billing account information.

8. The method of claim 6, further comprising the second source:

recording the transaction authorization;

storing the billing information;

and then processing an order to fulfill the transaction authorization for the second transaction to the user.

9. The method of claim 1, wherein the transaction authorization comprises an explicit authorization to order a second product or service.

10. A system comprising:

a processor;

a memory coupled to said processor and containing code which when executed;

obtains from a first source on a network a first set of information to be displayed to a user, wherein the first set of information comprises information identifying a first transaction;

accepts transaction data from the user to effect the first transaction;

notifies a second source of the first transaction;

obtains from the second source on the network, data to display to the user a visual representation of a second set of information identifying a transaction as though originating from the first source;

obtains user assent to share the transaction data with the second source;

forwards the transaction data to the second source; and wherein notifying a second source and obtaining from the second source comprise autonomously communicating with the second source without the user's knowledge.

11. The system of claim 10, further comprising code to accept a user transaction authorization directed to the first source for the second transaction.

12. The system of claim 10, further comprising code to accept identification of the second set of information as determined by the second source.

13. The system of claim 10, wherein the second set of information comprises information related to the first set of information.

14. The system of claim 10, wherein accepting transaction data to effect the first transaction comprises at least one of a sales transaction, information identifying a product or service to be purchased, and billing information.

15. The system of claim 10, wherein the notifying, obtaining from the second source, and forwarding the transaction data are to occur in real time.

16. The system of claim 10, wherein the user assent to share the transaction data with a second source comprises a user selection action.

17. An article of manufacture comprising:

a machine-readable medium having program therein which when accessed by a processor causes a computer to obtain a first set of information from a first source on a network, wherein the first set of information comprises information identifying a first product or service to be purchased;

display the first set of information to a user as provided from a first source;

accept billing information from the user needed to pay for a sale of the first product or service;

obtain a second set of information from a second source on the network, without further user action and without the user's knowledge of the obtaining a second set of information, wherein the second set of information comprises information identifying a second product or service to be purchased;

display the second set of information to a user as provided from the first source;

accept a purchase authorization directed to the first source for the second product or service, wherein the purchase authorization comprises a user authorization to share the billing information with a second source; and forward the billing information to the second source.

18. The article of manufacture of claim 17, wherein obtaining the second set of information comprises storing a previously transmitted second set of information in a database at the first source.

19. The article of manufacture of claim 17, further comprising data to cause a computer to identify the second set of information based on one of a user selection action and an association with the first set of information.

20. The article of manufacture of claim 17, wherein the displaying the second set of information comprises displaying the second set of information in one of a pop-up screen, a banner advertisement, a link to a source, and an embedded display of information embedded into the text and graphics of the displayed first set of information.

21. The article of manufacture of claim 17, wherein said first source is a first information window at a first system address and said second source is at a second system.

22. A system comprising:

a processor;

a memory coupled to said processor and containing code which when executed obtains from an associated first source a first set of information to be displayed to a user, wherein the first set of information comprises information identifying a first transaction;

accepts transaction data from the user to effect the first transaction;

notifies an associated second source of the first transaction;

obtains from the associated second source, data to display to the user a visual representation of a second set of information identifying a second transaction; and forwards the transaction data to the second source.

23. The system of claim 22, further comprising code to obtain user assent to share the transaction data with the second source, and wherein notifying an associated second source and obtaining from the associated second source comprise autonomously communicating with the associated second source without the user's knowledge.

24. The system of claim 22, further comprising code to receive an actuation means to forward the transaction data to the associated second source in a secure fashion.

25. A method comprising:
providing a first set of electronic information to be displayed to a user, wherein the first set of electronic information comprises information identifying a first transaction associated with a first source;
accepting transaction data from the user to effect the first transaction; and
providing data to be displayed to the user without the user's knowledge of an origin of a second set of information and that contains the second set of electronic information obtained from a second source and that identifies a second transaction.

26. The method of claim 25, further comprising forwarding the transaction data to the second source.

27. The method of claim 25, further comprising notifying an associated second source of the first transaction comprising autonomously communicating with the second source without the user's knowledge.

28. The method of claim 25, wherein the second set of information comprises a previously stored second set of information in a database at the first source.

29. The method of claim 25, wherein the data to be displayed comprises data to be displayed as though the second set of information originated from the first source.

30. The method of claim 25, further comprising selecting the second source from a plurality of second sources and selecting the second set of information from a plurality of second sets of information.

* * * * *